US012542479B2

(12) United States Patent
Ursino et al.

(10) Patent No.: US 12,542,479 B2
(45) Date of Patent: Feb. 3, 2026

(54) STARTUP FOR NON-ISOLATED HYBRID SIGMA CONVERTERS

(71) Applicant: Infineon Technologies Austria AG, Villach (AT)

(72) Inventors: Mario Ursino, Villach (AT); Roberto Rizzolatti, Villach (AT)

(73) Assignee: Infineon Technologies Austria AG, Villach (AT)

( * ) Notice: Subject to any disclaimer, the term of this patent is extended or adjusted under 35 U.S.C. 154(b) by 279 days.

(21) Appl. No.: 18/505,213

(22) Filed: Nov. 9, 2023

(65) Prior Publication Data
US 2025/0158509 A1    May 15, 2025

(51) Int. Cl.
*H02M 1/00*    (2007.01)
*H02M 3/158*    (2006.01)

(52) U.S. Cl.
CPC ....... *H02M 1/0095* (2021.05); *H02M 1/0074* (2021.05); *H02M 3/158* (2013.01)

(58) Field of Classification Search
CPC ... H02M 1/0074; H02M 1/0095; H02M 3/158
See application file for complete search history.

(56) References Cited

U.S. PATENT DOCUMENTS

| 7,872,886 B2 * | 1/2011 | Xu | H02M 3/1584 307/77 |
| 2005/0286278 A1 * | 12/2005 | Perreault | H02J 1/102 363/65 |
| 2022/0263410 A1 * | 8/2022 | Saggini | H02M 3/07 |
| 2022/0271657 A1 * | 8/2022 | Rizzolatti | H02M 3/01 |

\* cited by examiner

*Primary Examiner* — Gary A Nash
(74) *Attorney, Agent, or Firm* — Banner & Witcoff, Ltd.

(57) ABSTRACT

A power converter circuit, including: an unregulated sub-converter; a regulated sub-converter connected to the unregulated sub-converter, wherein the power converter circuit is configured as an input-series-output-parallel (ISOP) non-isolated power converter circuit; and a control circuit operable, during a startup of the power converter circuit, to: control the unregulated sub-converter with a transition from an initial unregulated duty cycle to a nominal unregulated duty cycle, which is higher than the initial unregulated duty cycle; and control the regulated sub-converter with a transition from an initial regulated duty cycle to a nominal regulated duty cycle to maintain an output voltage of the power converter circuit to be lower than a nominal output voltage.

20 Claims, 5 Drawing Sheets

STARTUP FOR NON-ISOLATED HYBRID SIGMA CONVERTERS

BACKGROUND

Data centers consume approximately 2-3% of the world's electricity. Data center operators are therefore engaged in an ongoing pursuit to improve the efficiency of converting alternating current to point-of-load while concurrently increasing the computational power of processing units such as CPUs, GPUs, ASICs, etc. This goal is particularly pronounced in machine learning and artificial intelligence, where the need for powerful GPUs and custom-designed ASICS to fulfill high computational power requests is paramount, especially during training phases.

A shift towards system operation at an input voltage of 48 V or 40-60 V, instead of the prevailing 12 V standard, offers advantages such as lower distribution losses. However, transitioning to 48 V systems requires the incorporation of new power converters to step the input voltage down to the requisite core voltage levels. A family of converter topologies, sigma converters, is based on multiple sub-converters in an Input Series, Output Parallel (ISOP) configuration. The startup of ISOP converters, especially in the case of an ISOP converter with an unregulated sub-converter, is often accomplished using an eFuse, which ramps up the input voltage while the sub-converters are switching. However, this requires additional space for an eFuse controller and eFuse power devices.

BRIEF DESCRIPTION OF THE FIGURES

FIG. 2 illustrates waveform diagrams of a startup of the power converter in accordance with aspects of the disclosure.

DETAILED DESCRIPTION

Figure 1:
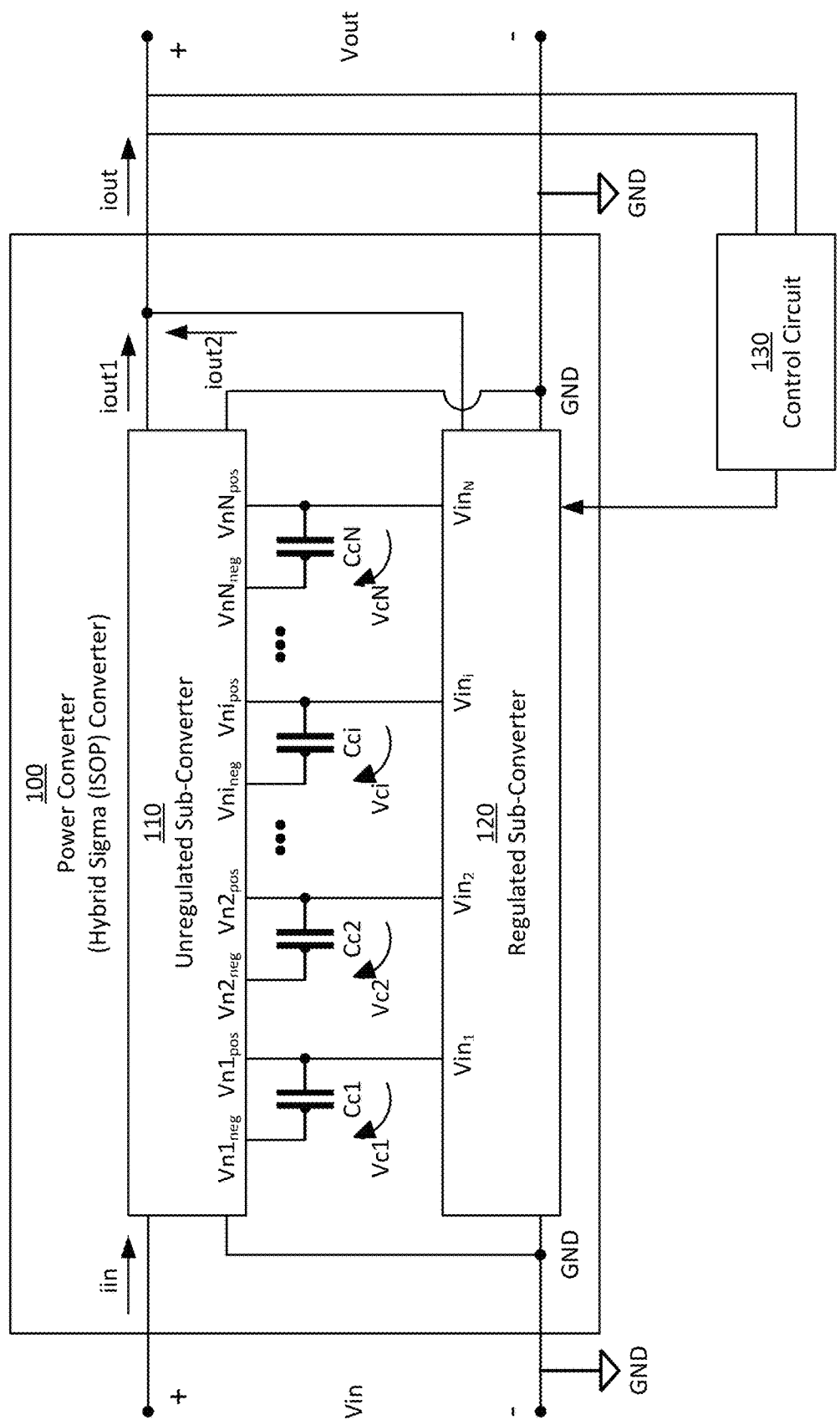
FIG. 1 illustrates a schematic diagram of a power converter in accordance with aspects of the disclosure.

FIG. 1 illustrates a schematic diagram of a power converter 100 in accordance with aspects of the disclosure.

The power converter 100 is a hybrid sigma converter. It is configured as an input-series-output-parallel (ISOP) non-isolated power converter.

The power converter 100 comprises an unregulated sub-converter 110, a regulated sub-converter 120, and a control circuit 130. The disclosure is not limited to two sub-converters. The power converter 100 is a hybrid power converter with at least one unregulated sub-converter and at least one regulated sub-converter.

The regulated sub-converter 120 is connected to the unregulated sub-converter 110 and is a buck converter. The unregulated sub-converter 110 is a higher efficiency $\eta_1$ path than the regulated sub-converter 120 lower efficiency $\eta_2$ path. The unregulated sub-converter 110 therefore receives a greater percentage than the regulated sub-converter 120. The input current is forced to be equal, and thus the power is split in favor of the more efficient unregulated sub-converter 110.

In prior power converters, if there were no eFuse, at startup a destructive inrush current would flow into the unregulated sub-converter 110. This disclosure is directed to a startup of the power converter 100, which does not rely on an eFuse at its input. The sub-converters 110 and 120 are driven with different switching frequencies and duty cycles to avoid destructive inrush currents and to enable control circuit 130 to detect an end of the unregulated startup phase.

Specifically, the control circuit 130 is operable, during a startup of the power converter 100, to control the unregulated sub-converter 110 with a transition from an initial unregulated duty cycle $D_{unreg}$ to a nominal unregulated duty cycle $D_{unreg}^{nominal}$, which is higher than the initial unregulated duty cycle $D_{unreg}$. Additionally, the control circuit 130 is operable to control the regulated sub-converter 120 with a transition from an initial regulated duty cycle $D_{reg}$ to a nominal regulated duty cycle $D_{reg}^{nominal}$ to maintain an output voltage of the power converter circuit to be lower than a nominal output voltage. The nominal regulated duty cycle $D_{reg}^{nominal}$ could be higher, or in some cases lower, than the initial regulated duty cycle $D_{reg}$.

FIG. 2 illustrates waveform diagrams 200 of a startup of the power converter 100 in accordance with aspects of the disclosure.

The control circuit 130 controls the startup control of the power converter 100 in three phases. These particular three phases are described as an example and are not meant to be limiting.

During the initial phase of the startup of the power converter 100 (in this example, Phase 1), the control circuit 130 is operable to control the unregulated sub-converter 110 to increase gradually in a transition from the initial unregulated duty cycle $D_{unreg}$ to the nominal unregulated duty cycle $D_{unreg}^{nominal}$, and a transition from an initial unregulated frequency $f_{unreg}$ to a nominal unregulated frequency $f_{unreg}^{nominal}$, which is higher than the initial unregulated frequency $f_{unreg}$. It is also operable to control the regulated sub-converter 120 at the initial regulated duty cycle $D_{reg}$. An output voltage $V_{out}$ of the power converter 100 increases from 0V to and subsequently remains at an intermediate, plateau output voltage $V_{plateau}$, which is between zero and a nominal output voltage $V_{out, ref}$ (0V<$V_{plateau}$<$V_{out, ref}$).

Many factors, including duty cycles, switching frequencies, transformation ratio, voltage converter topology, and the characteristics of actual capacitors, among others, influence the magnitude of the plateau voltage $V_{plateau}$. For example, when external capacitors significantly outweigh the internal capacitors of a capacitive divider, the plateau voltage $V_{plateau}$ is lower. Conversely, plateau voltage $V_{plateau}$ will be higher when the opposite condition is met. Also, the ratio of the output voltage to the input voltage ($V_{out}/V_{in}$) depends on a fixed transformation ratio of the unregulated sub-converter 110 and the regulated duty cycle $D_{reg}$ of the regulated sub-converter 120.

During a middle phase of the startup of the power converter 100 (in this example, Phase 2), the unregulated frequency $f_{unreg}$ and the unregulated duty cycle $D_{unreg}$ have reached their nominal values ($f_{unreg}^{nominal}$ and $D_{unreg}^{nominal}$) and stop increasing. The regulated frequency $f_{reg}$ and regulated duty cycle $D_{reg}$ remain fixed at their initial values. The output voltage $V_{out}$ remains at the plateau output voltage $V_{plateau}$.

During this middle phase, internal and output capacitors do not change in voltage. The control circuit 130 is operable to detect this phase based on the condition that the output voltage $V_{out}$ is equal to the intermediate plateau voltage ($V_{out}=V_{plateau}$), indicating that no current is flowing from input to output. The unregulated sub-converter 110 is operating in its nominal conditions and capable of delivering the required output power. In particular, the regulated sub-converter 110 maintains the output voltage $V_{out}$ lower than its nominal value $V_{out,\,ref}$ by the regulated duty cycle $D_{reg}$ to thereby decrease the inrush current through the unregulated sub-converter 110.

During a final phase of a startup of the power converter 100 (in this example, Phase 3), the control circuit 130 is operable to control the unregulated sub-converter 110 at a nominal unregulated frequency $f_{unreg}^{nominal}$ and the nominal unregulated duty cycle $D_{unreg}^{nominal}$. It is also operable to control the regulated sub-converter 120 with a transition from the initial regulated duty cycle $D_{reg}$ to the nominal regulated duty cycle $D_{reg}^{nominal}$. The output voltage $V_{out}$ of the power converter 100 increases from the plateau output voltage $V_{plateau}$ to the nominal output voltage $V_{out,\,ref}$. During, or at the end of Phase 3, the regulated duty cycle $D_{reg}$ is transferred to a voltage regulator to regulate the output voltage $V_{out}$ during a normal operation.

Figure 3A:
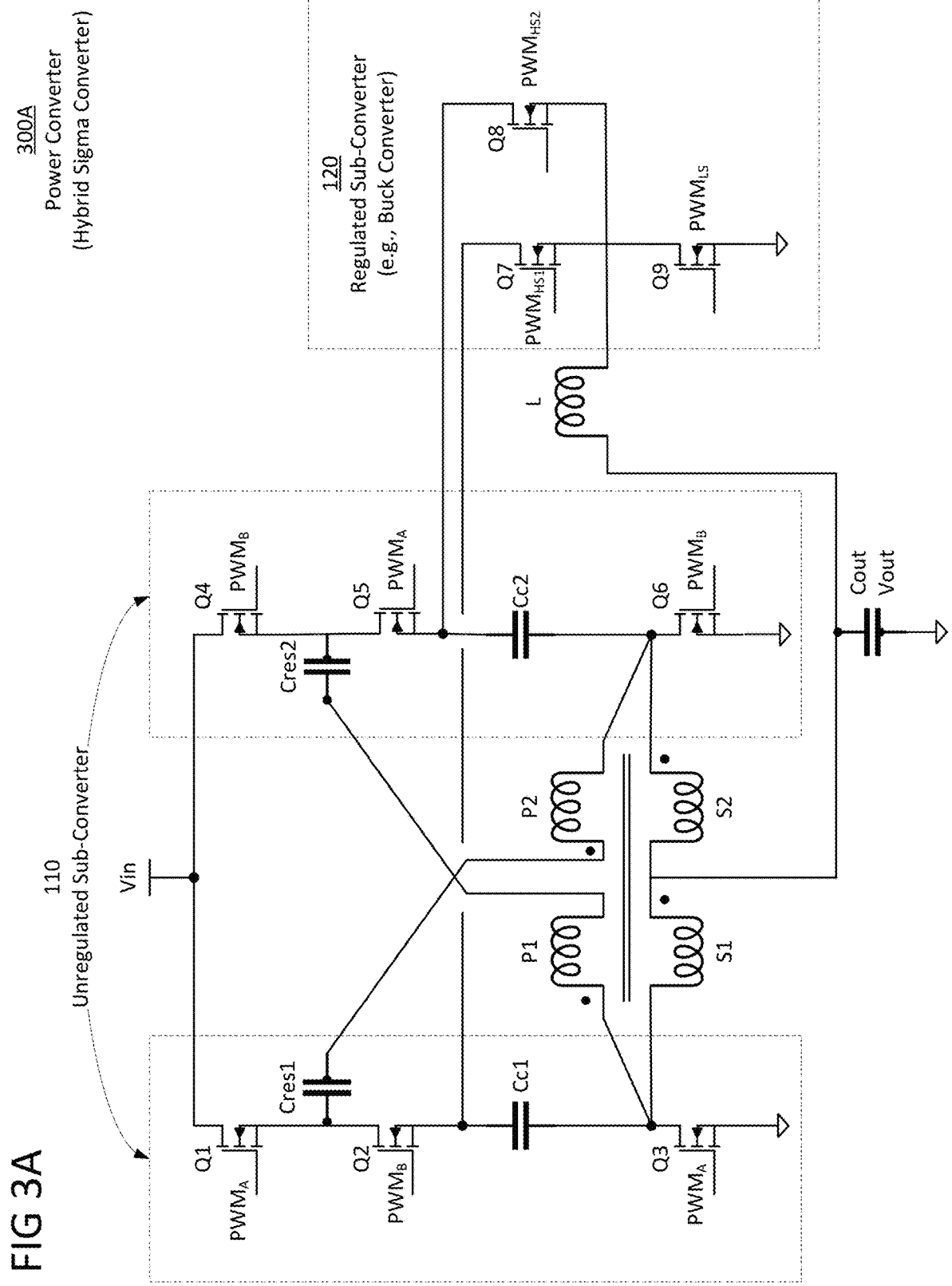
FIG. 3A illustrates a circuit diagram of an example power converter in accordance with aspects of the disclosure.
Figure 3B:
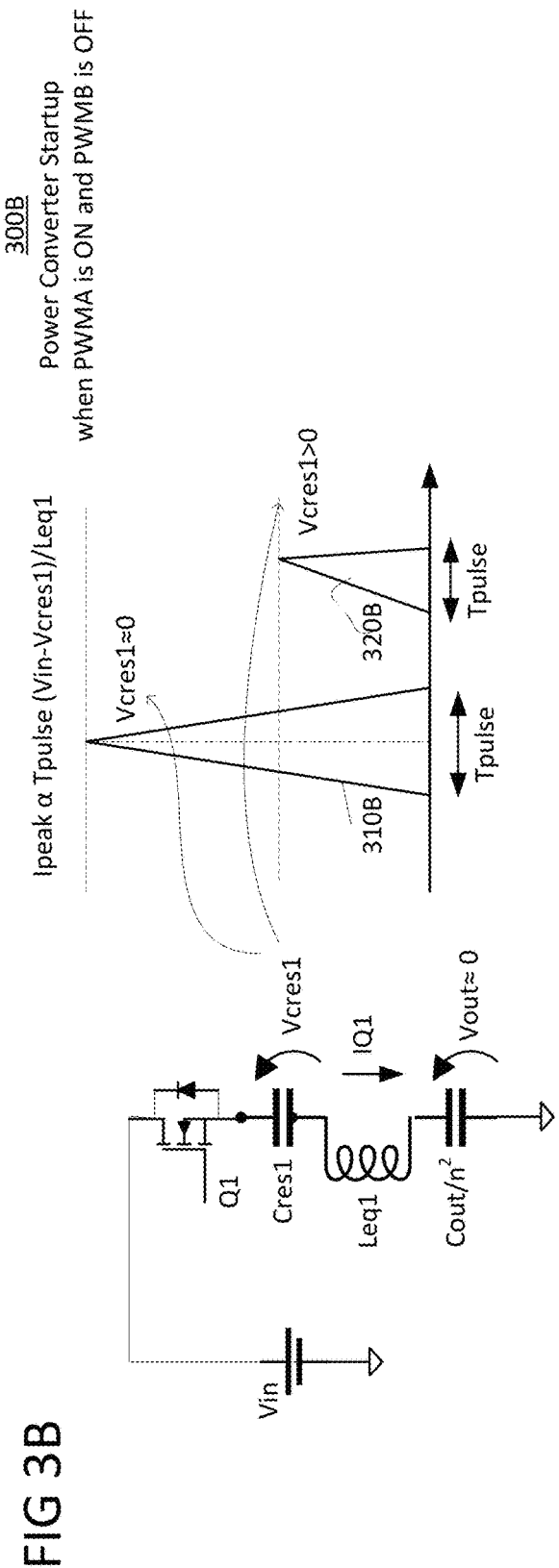
FIGS. 3B and 3C illustrate equivalent circuits of the unregulated sub-converter 110 at startup in accordance with aspects of the disclosure.
Figure 3C:
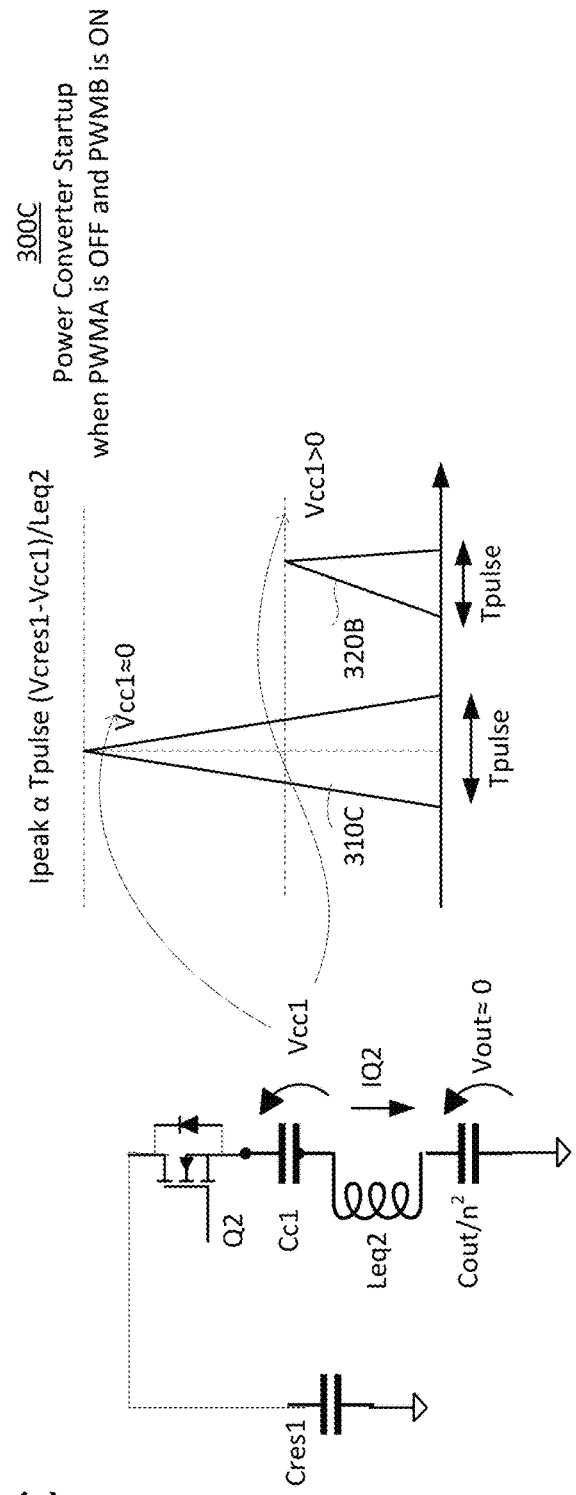
Figure 3D:
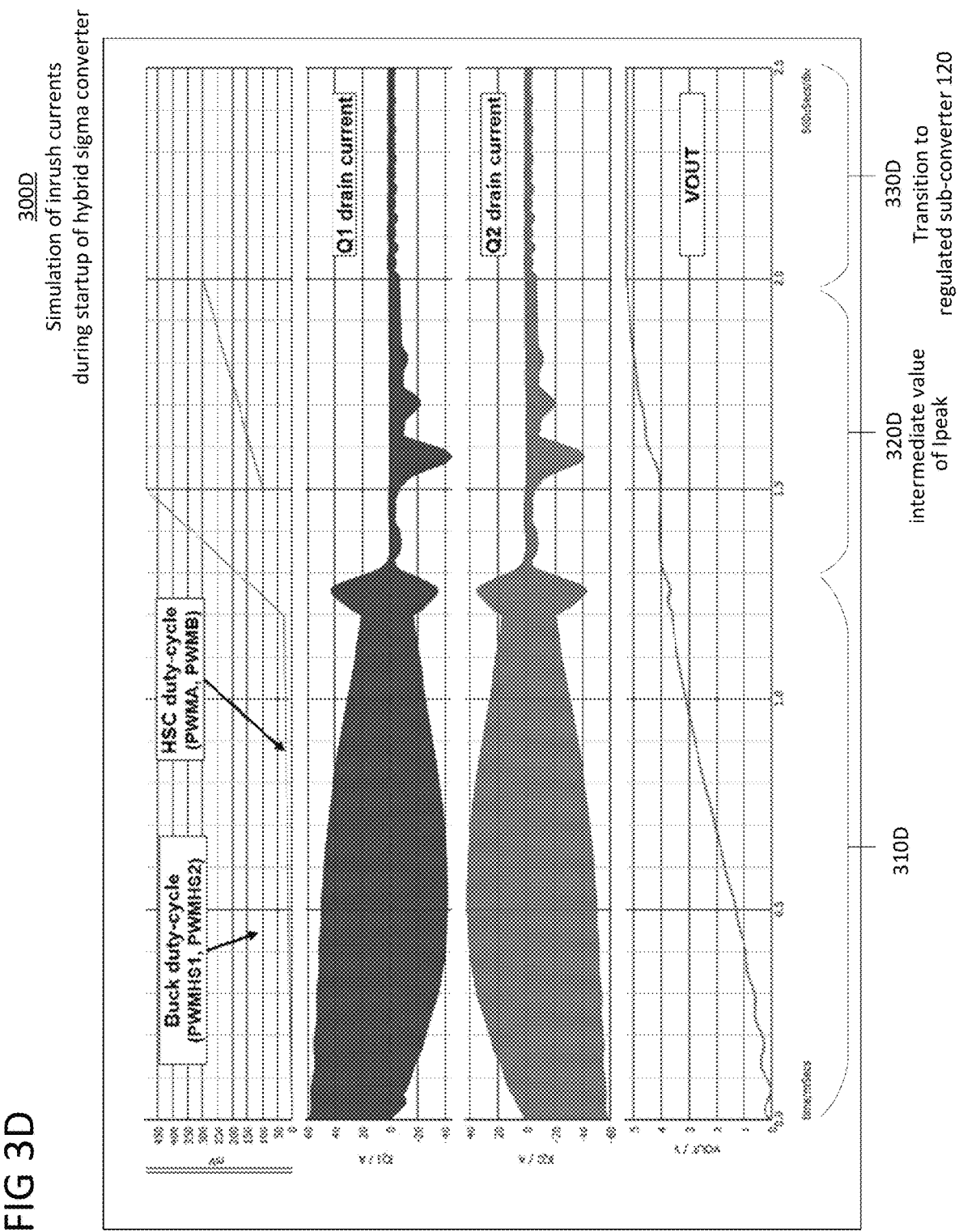
FIG. 3D illustrates signal diagrams of a simulation of a power converter during startup, in accordance with aspects of the disclosure.

FIG. 3A illustrates a circuit diagram 300A of an example of the power converter 100 in accordance with aspects of the disclosure. The details of the circuit elements are understood by those of ordinary skill. For the sake of brevity, a detailed description of the operation of this circuit diagram 300A is not provided here. FIGS. 3B and 3C illustrate equivalent circuits 300B and 300C of the unregulated sub-converter 110 at startup in accordance with aspects of the disclosure FIG. 3D illustrates signal diagrams of a simulation of a power converter during startup, in accordance with aspects of the disclosure.

The regulated frequency $f_{reg}$ of the regulated sub-converter 120 is fixed. It is preferable to have the regulated frequency $f_{reg}$ be equal to, and synchronized with, the unregulated nominal frequency $f_{unreg}^{nominal}$ ($f_{reg}=f_{unreg}^{nominal}$). Generally, however, the frequencies may be different.

At the beginning of the startup sequence, each of the capacitors has a voltage value of zero. Internal resonant capacitor $C_{res1}$ and internal capacitor Cc1 are much smaller in value than the output capacitor $C_{out}$. The value of the internal capacitor Cc1 is much greater than that of the resonant capacitor $C_{res}$ (Cc1>>$C_{res1}$). The output voltage $V_{out}$ is negligible with respect to the inrush current, and the effects of the winding are modeled as a single loop inductance Leq1/Leq2 in FIGS. 3B and 3C because, at this point, they do not generate any output voltage. During startup, the control circuit 130 decreases the inrush currents on the unregulated sub-converter 110 during the two switching intervals: the first switching interval when $PWM_A$ (pulse width modulated signal) is on and $PWM_B$ is off, and the second switching interval when $PWM_A$ is off, and $PWM_B$ is on.

FIG. 3B shows the equivalent circuit 300B of the unregulated sub-converter 110 at startup during the first switching interval, when $PWM_A$ is on, and PWMB is off. The inrush currents are decreased by increasing the voltage on capacitor Cres1. A power converter that rapidly increases the voltage on this capacitor can greatly decrease the current stress on transistor Q1.

FIG. 3C shows the equivalent circuit 300C of the unregulated sub-converter 110 at startup during the second switching phase, when $PWM_A$ is off, and $PWM_B$ is on. Capacitor Cres1 is in series with capacitor Cc1. The regulated sub-converter 120 imposes a voltage Vcc1, which decreases the excitation of the loop inductance Leq2. Therefore, with the presence of the regulated sub-converter 120, the inrush current on transistor $Q_2$ is decreased. Moreover, the capacitor Cres1 has a higher voltage in a next phase when $PWM_A$ is on, and $PWM_B$ is off again because Capacitor Cc1 is in the path to ground GND and starves capacitor Cres1 discharge, further decreasing the inrush current.

As shown in FIGS. 3B-3D, when transistor Q1 is pulsed on at the beginning of the startup when all circuit elements are discharged ($V_{cres1}\approx 0$; $V_{cc1}\approx 0$), there is a steep increase in the peak current $I_{peak}$ 310B, 310C, 310D (e.g., 60 amps). If the power converter 100/300A is started directly in a steady state with a large duty cycle, the transistors would instantly die due to the extreme inrush current. During subsequent pulses, the capacitors have some charge to an intermediate value ($V_{cres1}>0$; $V_{cc1}>0$), as shown by the second peak 320B, 320C, 320D. The peak current $I_{peak}$ starts to decrease and keeps decreasing until the capacitors are charged to the intermediate value (e.g., 20 amps. The power converter 100/300A operation is then transferred over 330D to the regulated sub-converter 120.

With the disclosed aspects, the regulated sub-converter 120 may be designed with lower-voltage class devices. With previous power converters, the regulated sub-converter 120 endured the full input voltage to provide startup capability without an eFuse. Transistors in the regulated sub-converter 120 were oversized to support startup, which is no longer required in view of the aspects of the disclosure. Consequently, power converters in accordance with the disclosed aspects have higher density and/or higher efficiency.

The techniques of this disclosure may also be described in the following examples.

Example 1. A power converter circuit, comprising: an unregulated sub-converter; a regulated sub-converter connected to the unregulated sub-converter, wherein the power converter circuit is configured as an input-series-output-parallel (ISOP) non-isolated power converter circuit; and a control circuit operable, during a startup of the power converter circuit, to: control the unregulated sub-converter with a transition from an initial unregulated duty cycle to a nominal unregulated duty cycle, which is higher than the initial unregulated duty cycle; and control the regulated sub-converter with a transition from an initial regulated duty cycle to a nominal regulated duty cycle to maintain an output voltage of the power converter circuit to be lower than a nominal output voltage.

Example 2. The power converter circuit of example 1, wherein the control circuit is operable to detect when an output voltage of the power converter circuit increases to and subsequently remains at a plateau output voltage, which is between zero and the nominal output voltage.

Example 3. The power converter circuit of any or more of examples 1-2, wherein while the output voltage remains at the plateau output voltage, the control circuit is operable to control the unregulated sub-converter at the nominal unregulated duty cycle and a nominal unregulated frequency.

Example 4. The power converter circuit of any or more of examples 1-3, wherein while the output voltage remains at the plateau output voltage, the control circuit is operable to control the regulated sub-converter at the initial regulated duty cycle.

Example 5. The power converter circuit of any or more of examples 1-4, wherein during the startup of the power converter circuit, the control circuit is operable to control the unregulated sub-converter with a transition from an initial unregulated frequency to a nominal unregulated frequency, which is higher than the initial unregulated frequency.

Example 6. The power converter circuit of any or more of examples 1-5, wherein during a middle phase of the startup of the power converter circuit, the control circuit is operable to: control the unregulated sub-converter at a nominal unregulated frequency and the nominal unregulated duty cycle; and control the regulated sub-converter at the initial regulated duty cycle, wherein the output voltage of the power converter circuit remains at a plateau output voltage, which is between zero and the nominal output voltage.

Example 7. The power converter circuit of any or more of examples 1-6, wherein during an initial phase of the startup of the power converter circuit, the control circuit is operable to: control the unregulated sub-converter with the transition from the initial unregulated duty cycle to the nominal unregulated duty cycle, and a transition from an initial unregulated frequency to a nominal unregulated frequency, which is higher than the initial unregulated frequency; and control the regulated sub-converter at the initial regulated duty cycle, wherein an output voltage of the power converter circuit increases to a plateau output voltage, which is between zero and a nominal output voltage.

Example 8. The power converter circuit of any or more of examples 1-7, wherein during a final phase of a startup of the power converter circuit, the control circuit is operable to: control the unregulated sub-converter at a nominal unregulated frequency and the nominal unregulated duty cycle; and control the regulated sub-converter with the transition from the initial regulated duty cycle to the nominal regulated duty cycle, wherein an output voltage of the power converter circuit increases from a plateau output voltage, which is between zero and a nominal output voltage, to the nominal output voltage.

Example 9. The power converter circuit of any or more of examples 1-8, wherein the control circuit is operable to control the unregulated sub-converter and the regulated sub-converter to operate in a synchronized manner and at a same frequency.

Example 10. The power converter circuit of any or more of examples 1-9, wherein the regulated sub-converter is a buck converter.

Example 11. A method for controlling a startup of a power converter circuit having a regulated sub-converter connected to an unregulated sub-converter, the method comprising: controlling, by a control circuit, the unregulated sub-converter with a transition from an initial unregulated duty cycle to a nominal unregulated duty cycle, which is higher than the initial unregulated duty cycle; and controlling by the control circuit, the regulated sub-converter with a transition from an initial regulated duty cycle to a nominal regulated duty cycle to maintain an output voltage of the power converter circuit to be lower than a nominal output voltage, wherein the power converter circuit is configured as an input-series-output-parallel (ISOP) non-isolated power converter circuit.

Example 12. The method of example 11, further comprising: detecting, by the control circuit, when the output voltage of the power converter circuit increases to and subsequently remains at a plateau output voltage, which is between zero and a nominal output voltage.

Example 13. The method of any or more of examples 11-12, further comprising: while the output voltage remains at the plateau output voltage, controlling the unregulated sub-converter at the nominal unregulated duty cycle and a nominal unregulated frequency.

Example 14. The method of any or more of examples 11-13, further comprising: while the output voltage remains at the plateau output voltage, controlling the regulated sub-converter at the initial regulated duty cycle.

Example 15. The method of any or more of examples 11-14, further comprising: during the startup of the power converter circuit, controlling the unregulated sub-converter with a transition from an initial unregulated frequency to a nominal unregulated frequency, which is higher than the initial unregulated frequency.

Example 16. The method of any or more of examples 11-15, wherein during a middle phase of the startup of the power converter circuit, the method further comprises: controlling the unregulated sub-converter at a nominal unregulated frequency and the nominal unregulated duty cycle; and controlling the regulated sub-converter at the initial regulated duty cycle, wherein the output voltage of the power converter circuit remains at a plateau output voltage, which is between zero and the nominal output voltage.

Example 17. The method of any or more of examples 11-16, wherein during an initial phase of the startup of the power converter circuit, the method further comprises: controlling the unregulated sub-converter with the transition from the initial unregulated duty cycle to the nominal unregulated duty cycle, and a transition from an initial unregulated frequency to a nominal unregulated frequency, which is higher than the initial unregulated frequency; and controlling the regulated sub-converter at the initial regulated duty cycle, wherein the output voltage of the power converter circuit increases to a plateau output voltage, which is between zero and the nominal output voltage.

Example 18. The method of any or more of examples 11-17, wherein during a final phase of a startup of the power converter circuit, the method further comprises: controlling the unregulated sub-converter at a nominal unregulated frequency and the nominal unregulated duty cycle; and controlling the regulated sub-converter with the transition from the initial regulated duty cycle to the nominal regulated duty cycle, wherein the output voltage of the power converter circuit increases from a plateau output voltage, which is between zero and the nominal output voltage, to the nominal output voltage.

Example 19. The method of any or more of examples 11-18, further comprising: controlling the unregulated sub-converter and the regulated sub-converter to operate in a synchronized manner and at a same frequency.

Example 20. The method of any or more of examples 11-19, further comprising: at an end of the startup of the power converter circuit, beginning a control of the power converter circuit for normal operation.

While the foregoing has been described in conjunction with exemplary embodiment, it is understood that the term "exemplary" is merely meant as an example, rather than the best or optimal. Accordingly, the disclosure is intended to cover alternatives, modifications, and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A power converter circuit, comprising:
an unregulated sub-converter;
a regulated sub-converter connected to the unregulated sub-converter, wherein the power converter circuit is configured as an input-series-output-parallel (ISOP) non-isolated power converter circuit; and a control circuit operable, during a startup of the power converter circuit, to:
control the unregulated sub-converter with a transition from an initial unregulated duty cycle to a nominal unregulated duty cycle, which is higher than the initial unregulated duty cycle; and
control the regulated sub-converter with a transition from an initial regulated duty cycle to a nominal regulated duty cycle to maintain an output voltage of the power converter circuit to be lower than a nominal output voltage.

2. The power converter circuit of claim 1, wherein the control circuit is operable to detect when the output voltage of the power converter circuit increases to and subsequently remains at a plateau output voltage, which is between zero and the nominal output voltage.

3. The power converter circuit of claim 2, wherein while the output voltage remains at the plateau output voltage, the control circuit is operable to control the unregulated sub-converter at the nominal unregulated duty cycle and a nominal unregulated frequency.

4. The power converter circuit of claim 3, wherein while the output voltage remains at the plateau output voltage, the control circuit is operable to control the regulated sub-converter at the initial regulated duty cycle.

5. The power converter circuit of claim 1, wherein during the startup of the power converter circuit, the control circuit is operable to control the unregulated sub-converter with a transition from an initial unregulated frequency to a nominal unregulated frequency, which is higher than the initial unregulated frequency.

6. The power converter circuit of claim 1, wherein during a middle phase of the startup of the power converter circuit, the control circuit is operable to:
control the unregulated sub-converter at a nominal unregulated frequency and the nominal unregulated duty cycle; and
control the regulated sub-converter at the initial regulated duty cycle,
wherein the output voltage of the power converter circuit remains at a plateau output voltage, which is between zero and the nominal output voltage.

7. The power converter circuit of claim 1, wherein during an initial phase of the startup of the power converter circuit, the control circuit is operable to:
control the unregulated sub-converter with the transition from the initial unregulated duty cycle to the nominal unregulated duty cycle, and a transition from an initial unregulated frequency to a nominal unregulated frequency, which is higher than the initial unregulated frequency; and
control the regulated sub-converter at the initial regulated duty cycle,
wherein the output voltage of the power converter circuit increases to a plateau output voltage, which is between zero and the nominal output voltage.

8. The power converter circuit of claim 1, wherein during a final phase of a startup of the power converter circuit, the control circuit is operable to:
control the unregulated sub-converter at a nominal unregulated frequency and the nominal unregulated duty cycle; and
control the regulated sub-converter with the transition from the initial regulated duty cycle to the nominal regulated duty cycle,
wherein the output voltage of the power converter circuit increases from a plateau output voltage, which is between zero and the nominal output voltage, to the nominal output voltage.

9. The power converter circuit of claim 1, wherein the control circuit is operable to control the unregulated sub-converter and the regulated sub-converter to operate in a synchronized manner and at a same frequency.

10. The power converter circuit of claim 1, wherein the regulated sub-converter is a buck converter.

11. A method for controlling a startup of a power converter circuit having a regulated sub-converter connected to an unregulated sub-converter, the method comprising:
controlling, by a control circuit, the unregulated sub-converter with a transition from an initial unregulated duty cycle to a nominal unregulated duty cycle, which is higher than the initial unregulated duty cycle; and
controlling by the control circuit, the regulated sub-converter with a transition from an initial regulated duty cycle to a nominal regulated duty cycle to maintain an output voltage of the power converter circuit to be lower than a nominal output voltage,
wherein the power converter circuit is configured as an input-series-output-parallel (ISOP) non-isolated power converter circuit.

12. The method of claim 11, further comprising:
detecting, by the control circuit, when the output voltage of the power converter circuit increases to and subsequently remains at a plateau output voltage, which is between zero and the nominal output voltage.

13. The method of claim 12, further comprising:
while the output voltage remains at the plateau output voltage, controlling the unregulated sub-converter at the nominal unregulated duty cycle and a nominal unregulated frequency.

14. The method of claim 13, further comprising:
while the output voltage remains at the plateau output voltage, controlling the regulated sub-converter at the initial regulated duty cycle.

15. The method of claim 11, further comprising:
during the startup of the power converter circuit, controlling the unregulated sub-converter with a transition from an initial unregulated frequency to a nominal unregulated frequency, which is higher than the initial unregulated frequency.

16. The method of claim 11, wherein during a middle phase of the startup of the power converter circuit, the method further comprises:
controlling the unregulated sub-converter at a nominal unregulated frequency and the nominal unregulated duty cycle; and
controlling the regulated sub-converter at the initial regulated duty cycle,
wherein the output voltage of the power converter circuit remains at a plateau output voltage, which is between zero and the nominal output voltage.

17. The method of claim 11, wherein during an initial phase of the startup of the power converter circuit, the method further comprises:
controlling the unregulated sub-converter with the transition from the initial unregulated duty cycle to the nominal unregulated duty cycle, and a transition from an initial unregulated frequency to a nominal unregulated frequency, which is higher than the initial unregulated frequency; and
controlling the regulated sub-converter at the initial regulated duty cycle, wherein the output voltage of the power converter circuit increases to a plateau output voltage, which is between zero and the nominal output voltage.

18. The method of claim 11, wherein during a final phase of a startup of the power converter circuit, the method further comprises:
controlling the unregulated sub-converter at a nominal unregulated frequency and the nominal unregulated duty cycle; and
controlling the regulated sub-converter with the transition from the initial regulated duty cycle to the nominal regulated duty cycle,
wherein the output voltage of the power converter circuit increases from a plateau output voltage, which is between zero and the nominal output voltage, to the nominal output voltage.

19. The method of claim 11, further comprising:
controlling the unregulated sub-converter and the regulated sub-converter to operate in a synchronized manner and at a same frequency.

20. The method of claim 11, further comprising:
at an end of the startup of the power converter circuit, beginning a control of the power converter circuit for normal operation.

* * * * *